United States Patent
Bartholomeyczik et al.

(10) Patent No.: US 8,594,964 B2
(45) Date of Patent: Nov. 26, 2013

(54) METHOD FOR COMPENSATING A MEASURED VALUE OFFSET

(75) Inventors: Julian Bartholomeyczik, Reutlingen (DE); Sergej Scheiermann, Eningen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 13/116,248

(22) Filed: May 26, 2011

(65) Prior Publication Data
US 2011/0301904 A1 Dec. 8, 2011

(30) Foreign Application Priority Data
Jun. 2, 2010 (DE) .......................... 10 2010 029 669

(51) Int. Cl.
*G01C 17/38* (2006.01)

(52) U.S. Cl.
USPC ................. 702/104; 702/92; 702/93; 702/94; 702/95; 702/150

(58) Field of Classification Search
USPC ............... 702/92–95, 104, 150–153; 701/224
See application file for complete search history.

(56) References Cited

U.S. PATENT DOCUMENTS

| 7,275,008 | B2 | 9/2007 | Plyvänäinen |
| 7,340,362 | B2 | 3/2008 | Kitamura et al. |
| 8,370,097 | B2 * | 2/2013 | Patel et al. ...................... 702/92 |
| 2008/0109166 | A1 * | 5/2008 | Takaoka et al. ............... 701/216 |
| 2008/0129282 | A1 * | 6/2008 | Lemp ............................ 324/202 |
| 2009/0108841 | A1 * | 4/2009 | Abe et al. ...................... 324/252 |
| 2010/0324862 | A1 * | 12/2010 | Sato et al. ..................... 702/150 |

* cited by examiner

*Primary Examiner* — Sujoy Kundu
(74) *Attorney, Agent, or Firm* — Kenyon & Kenyon LLP

(57) ABSTRACT

In a method for determining an offset of measured values of a multiaxial directional sensor using a superposed signal, a large number of multiaxial measured values are recorded first. Measured values, which are recorded in different orientations of the directional sensor, form a geometric figure in a coordinate system resulting from the measuring axes of the sensor, the ideal form of the geometric figure being known and the ideal center point of which being located at the origin of the measuring axes. In the case of a biaxial sensor, the geometric figure is a circle; in the case of a triaxial sensor, it is a sphere around the origin. The superposition caused by the interference is reflected in that the center point of the geometric figure is shifted in relation to the origin of the measuring axes. The offset is measured by determining this shift.

10 Claims, 4 Drawing Sheets

METHOD FOR COMPENSATING A MEASURED VALUE OFFSET

CROSS REFERENCE

The present application claims the benefit under 35 U.S.C. §119 of German Patent Application No. DE 102010029669.4 filed on Jun. 2, 2010, which is expressly incorporated in its entirety.

BACKGROUND INFORMATION

Directional sensors are frequently used in small devices such as cameras, telephones and binoculars in order to determine an orientation of the device in relation to a constant variable. This variable may be, for example, the earth's magnetic field. Frequently, such sensors are used in combination with other sensors, for example, acceleration sensors.

The result of the directional determination may be adversely affected by local interfering influences. A constant offset of the determined directions in a predetermined direction may be caused, for example, by a magnetic object or a power line in the direct environment of such a multidimensional magnetic field sensor. Various approaches for compensating such an offset are available.

U.S. Pat. No. 7,340,362 B2 describes a method for compensating the offset of a three dimensional magnetic field sensor. Measured values are recorded during a predetermined calibration phase. If successive measured values are different from one another, a newly recorded measured value is stored until a predetermined number of measured values is reached. An offset of the measured values is determined later from the stored data.

U.S. Pat. No. 7,275,008 B2 describes another variant in which a geometric body having a number of measured values lying on its surface is determined. Parameters which define a deviation of the shape of this body from the geometric reference figure of a sphere are determined. The parameters are used for a mapping in order to compensate measured values.

However, most of the conventional compensation methods are either imprecise or require high computational complexity often exceeding the computational capacities of a processing unit in a mobile device.

An object of the present invention is to specify a compensation method of the forenamed type which operates precisely and requires only slight computational complexity.

SUMMARY

In accordance with the present invention, a large number of multiaxial measured values are recorded first in a method for determining an offset of measured values of a multiaxial directional sensor using a superposed signal. Measured values, which are recorded in different orientations of the directional sensor, form a geometric figure in a coordinate system resulting from the measuring axes of the sensor, the ideal form of the geometric figure being known and the ideal center point of which being located at the origin of the measuring axes. In the case of a biaxial sensor, the geometric figure is a circle; in the case of a triaxial sensor, it is a sphere. The superposition caused by the interference is reflected in that the center point of the geometric figure is shifted in relation to the origin of the measuring axes. The superposition is established by determining this shift so that newly recorded measured values may be corrected for the shift.

To this end, a number of clusters are defined and a recorded measured value is assigned to one of the clusters or is discarded if a predetermined number of measured values has already been assigned to the cluster to which the measured value is assigned. Measured values are discarded if they are only able to contribute little to an improvement of an offset to be determined due to their geometric position. This makes it possible to reduce the size of a memory for storing the measured values and the calculation of the offset may be performed on a reduced number of measured values, making it possible to reduce the computational load while not adversely affecting the precision of the example method.

Advantageously, the determination of the offset is not made until the predetermined number of measured values has been assigned to each of a predetermined number of clusters. This easily determined condition ensures that the geometric distribution of the stored measured values is sufficient for determining the offset at a required precision and/or reliability.

The clusters may be uniformly distributed along the measuring axes. For example, the offset of the figure is not determined until 10% of the defined clusters exhibit one measured value each. The number of clusters to which a measured value has already been assigned may be used as an indicator of progress in collecting measured values.

The size of the cluster may be a power of two and the assignment may include division of the multiaxial measured value by a power of two. When binary coded measured values are processed by a microprocessor, the assignment to a cluster may entail division of the measured values by the size of the cluster without a remainder. The cluster size may be an integer or even a power of two. An advantage in the case of the last variant is that a division by a power of two may be implemented very simply by a bit by bit shift of the binary number to the right. This makes it possible to keep the load of the arithmetic logic unit executing the method very low.

After the offset is determined, additional measured values may be recorded and assigned to the clusters, and the offset may be updated. This makes it possible to update the determination of the offset continuously during a normal measurement operation by using newly recorded measured values ("in-use calibration"). A precision of the determination of the offset may thus be increased as the duration of the measurement increases.

Parameters that control the example method may in particular be changed after the determination of the offset. In one specific embodiment of the example method, the parameters may include at least one of the number of clusters on one of the measuring axes, the number of predetermined measured values per cluster and the predetermined number of clusters having assigned measured values. This makes it possible to improve a determination quality of the method while the requirements for memory or computational power are constant and/or the requirements may be reduced while the computational quality is constant.

In one preferred specific embodiment, the directional sensor is a magnetic field sensor, the number of measuring axes is three and the geometric figure is a sphere. The figure may preferably be determined using the conventional method of least squares as an approximation of the stored measured values. This makes it possible to keep a computational load of the entire method low for a determination unit on which the example method runs.

The example method may be stored in the form of a computer program product having program code on a computer-readable data carrier or it may be run on an execution unit.

BRIEF DESCRIPTION OF THE DRAWINGS

The present invention is described in greater detail below with reference to example embodiments and the figures.

DETAILED DESCRIPTION OF EXAMPLE EMBODIMENTS

Figure 1:
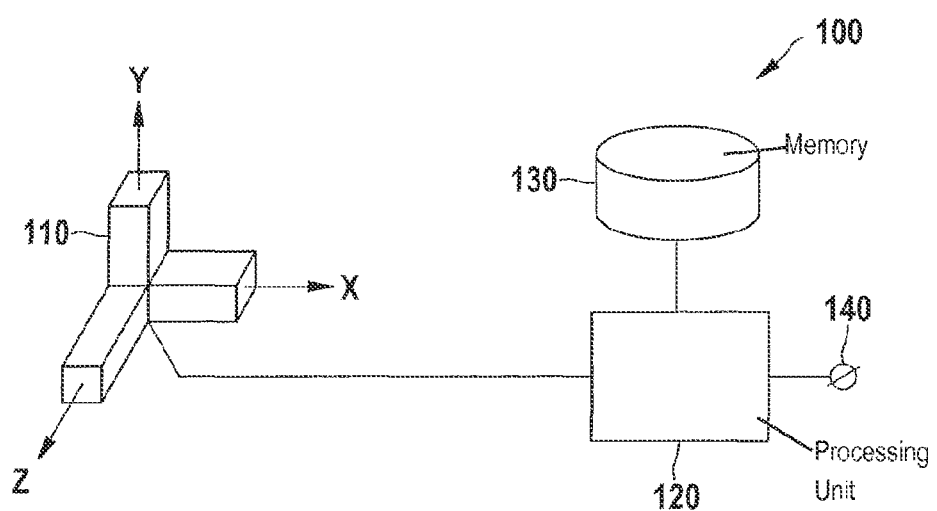
FIG. 1 shows a block diagram of a system for determining an offset of a multiaxial sensor.

FIG. 1 shows a block diagram of a system 100 for determining an offset of measured values of a multiaxial sensor. System 100 includes a multiaxial sensor 110, a processing unit 120, a memory 130 and an interface 140. Processing unit 120 is connected to multiaxial sensor 110, memory 130 and interface 140.

Multiaxial sensor 110 is a magnetic field sensor, which determines the components of a magnetic field in three components x, y and z perpendicular to one another. Multiaxial sensor 110 may be structured micromechanically as a microelectromechanic system ("MEMS"), for example.

Processing unit 120 is normally a digital processing unit such as a microprocessor system. A digitization arrangement for adapting a measured value provided by an analog arrangement to a digital processing unit 120 are not shown. Memory 130 is preferably a digital semiconductor memory. Processing unit 120 and memory 130 may be components of a mobile microprocessor-controlled device, for example, a mobile telephone. Interface 140 may be physical (in the form of hardware) and/or virtual (in the form of software) and allows the output or transfer of processed and unprocessed measured values and intermediate results, such as a determined offset of recorded measured values.

Figure 2:
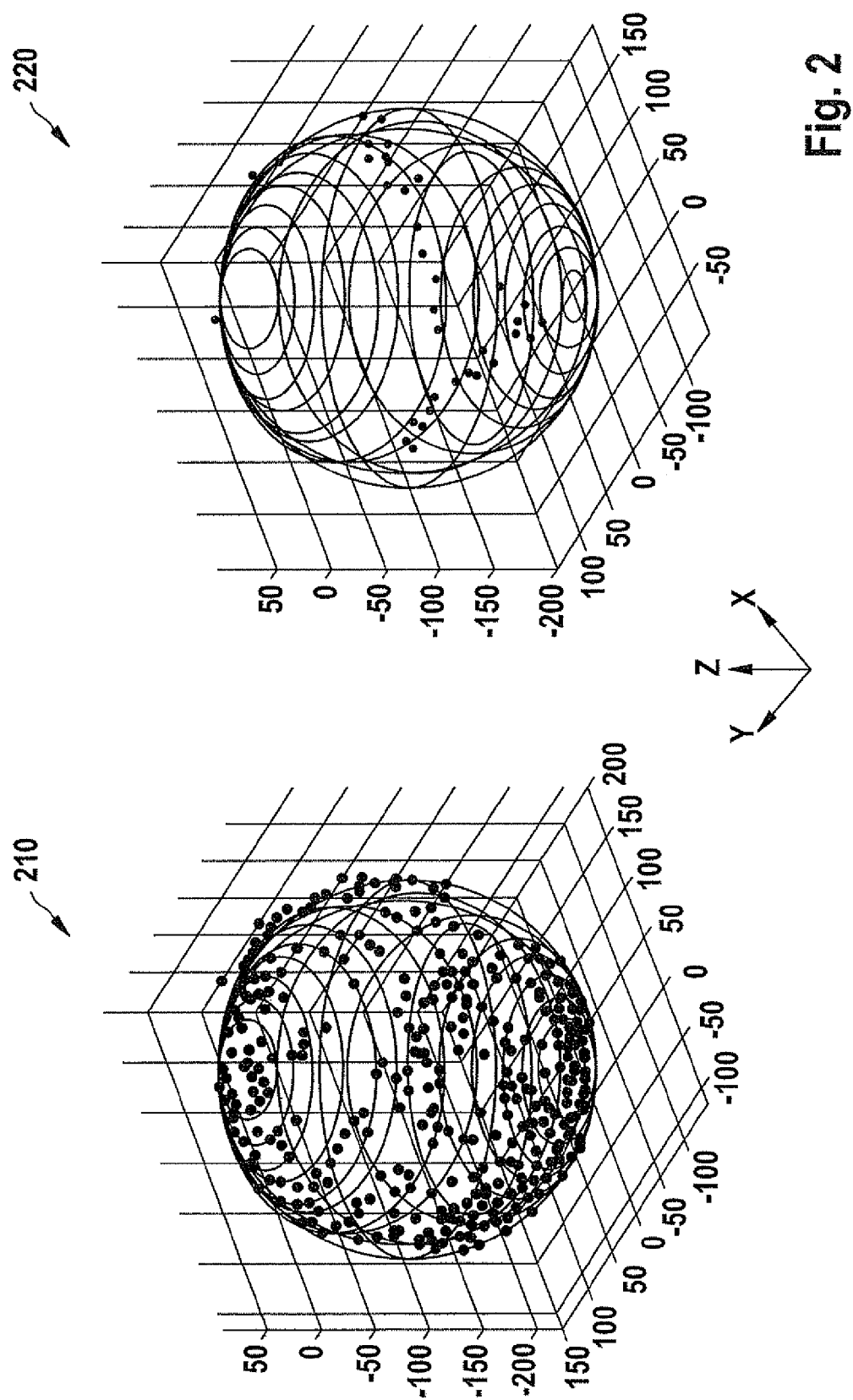
FIG. 2 shows a diagram of measured values and filtered measured values for the determination of the offset.

FIG. 2 shows a diagram of recorded and filtered measured values for the determination of the offset of measured values according to system 100 of FIG. 1. A left diagram 210 and a right diagram 220 each contain a Cartesian coordinate system which corresponds to the measuring axes of multiaxial sensor 110 from FIG. 1. Measured values are shown as black dots in left diagram 210, the measured values being recorded using multiaxial sensor 110. The recorded measured values lie on the surface of a first sphere 215, the surface of which is indicated by rings distributed along the z axis. The center point of first sphere 215 lies outside of the zero point of measuring axes x, y and z.

The measured values in left diagram 210 are distributed irregularly. In some areas of the surface of first sphere 215, the recorded measured values are close together, while few or even no measured values are present in other areas.

Right diagram 220 corresponds to left diagram 210 except that only measured values that were used for determination of the offset of the measured values using the method according to the present invention are drawn in as black dots. The filtered measured values lie on the surface of a second sphere 225. The number of filtered measured values is significantly smaller than that of the recorded measured values in left diagram 210 and neighboring filtered measured values are at a minimum distance from one another.

An object of an example method according to the present invention is to advantageously reduce the recorded values according to left diagram 210 to measured values according to right diagram 220, it being intended to preserve the determinability of the offset of sphere 215 or 225 in relation to the origin of measuring axes x, y and z.

Figure 3:
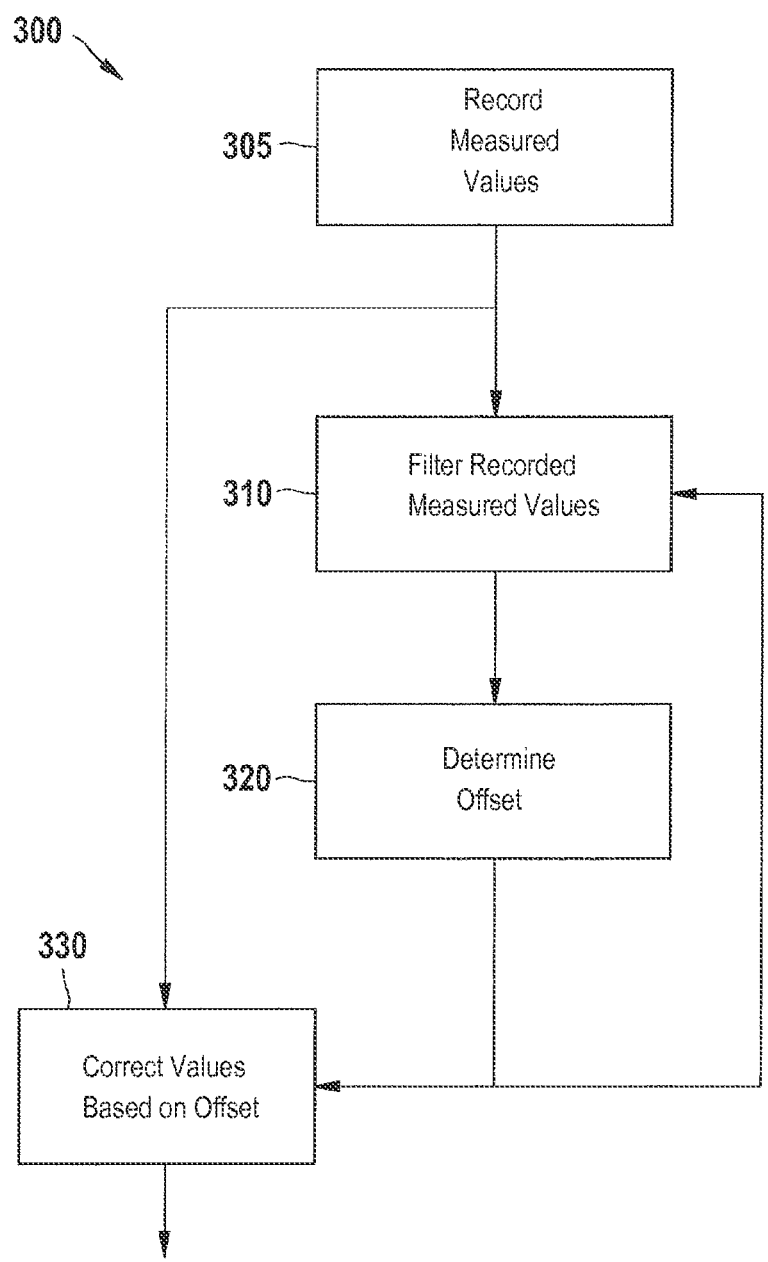
FIG. 3 shows a flow chart of an example method for determining the offset.

FIG. 3 shows a flow chart of an example method 300 for determining the offset according to FIGS. 1 and 2. According to the example method, measured values are recorded in a first step 305. A recorded measured value is subjected to filtering in a first step 310 to check if the recorded measured value improves an existing information base and to store the measured value if that is the case. The information base is formed by a number of stored measured values, based on which the offset of the measured values is to be determined later.

For the filtering, a check is performed to determine whether the direction on which the measured value is based is not already supported by additional measured values. The filtering in step 310 is based on assigning each recorded measured value to a predetermined number of clusters, the clusters representing different directions of the determined magnetic field. Only a predetermined number of measured values that refer to the same determined direction is stored; additional measured values are discarded. If the information base is large enough, for example, because a predetermined number of measured values at an adequate distance from one another was stored, method 300 continues to a step 320.

In step 320, the offset relating to all measured values is determined based on stored measured values. To that end, a numerical method, for example, the method of least squares, the Newton method or a Kalman filter, is used to approximate a geometric form in the space spanned by the measuring axes, the measured values lying on the surface of the geometric form. In the case of system 100 from FIG. 1, the geometric form is a sphere. The offset of the sphere in relation to the origin of the measuring axes is the sought offset of all measured values.

In a following step 330, recorded measured values may be corrected by this offset. Alternatively, only the offset determined in step 320 may also be provided as a result of method 300.

Method 300 may be continued during a measuring operation even after the first determination of the offset in step 320 by continuing to filter newly incoming measured values in step 310 and then redetermining the offset in step 320 based on the stored measured values. The determination of the offset in step 320 may be done, for example, after each storage of a predetermined number of new measured values or it may be time-controlled.

The filtering of measured values in step 310 is subject to the selection of parameters. In a first pass of method 300, predetermined values must be used for these parameters; in subsequent passes, the parameters may be adapted to the recorded measured values. Measured values that are stored in a preceding pass of step 310 may be deleted, changed or retained after a change of one of the parameters. Such a parameter is the number or size of the clusters. Another parameter is the number of clusters to which measured values must be assigned in order to determine the offset in step 320. A possibility for determining these parameters is stated in the following.

The radius of the sphere represented in FIG. 2 is determined as $$\text{Radius} = \text{earth's magnetic field} * \text{sensor sensitivity} \qquad \text{(Equation 1)}$$

Each of the clusters is defined as a spatial element which is determined by dividing the measuring area along the particular measuring axis by a constant.

Possible Implementation 1:

It is a possible determination of parameters:

The constant is identical for all measuring axes and should be a power of two:

$$Gruppe_{i,j,k} := \begin{pmatrix} i \cdot \dfrac{\text{Measured value}_x}{2^{nq}} \\ j \cdot \dfrac{\text{Measured value}_y}{2^{nq}} \\ k \cdot \dfrac{\text{Measured value}_z}{2^{nq}} \end{pmatrix} \quad \text{(Equation 2)}$$

where i, j and k are control variables (recorded measured values) and nq is the quantization number which is determined in the following manner:

$$nq := \log_2\left(\dfrac{4\pi \cdot \text{Radius}^2 \cdot N_c}{2{,}3 \cdot N_{pts}}\right) \quad \text{(Equation 3)}$$

where:
Radius=radius of the sphere from FIG. 2
$N_c$=number of measured values per cluster
$N_{pts}$=number of measured values for calibration.

To make it possible to store the required minimum number of points, the following conditions of the calculation of the quantization number are necessary:

$$nq := \begin{cases} \text{if } 2^{nq} \geq \text{Radius} \Rightarrow nq := \log_2(\text{Radius}) \\ \quad \text{if } 2^{nq} \leq 2 \leq nq := 2 \\ \text{otherwise} \Rightarrow nq := \log_2\left(\dfrac{4\pi \cdot \text{Radius}^2 \cdot N_c}{2{,}3 \cdot N_{pts}}\right) \end{cases} \quad \text{(Equation 4)}$$

An incoming measured value is first checked to determine if it adheres to a minimum distance of half a cluster from the most recently stored measured value:

$$\begin{cases} \text{if } (x_i - x_{last}) \geq (2^{nq-1}) \\ \text{if } (y_i - y_{last}) \geq (2^{nq-1}) \\ \text{if } (z_i - z_{last}) \geq (2^{nq-1}) \end{cases} \quad \text{(Equation 5)}$$

If this is the case, the incoming measured value is compared to each stored measured value:

$$\begin{cases} \text{if } (x_i \rangle\rangle 2^{nq})\langle\rangle(x_i \rangle\rangle 2^{nq}) \\ \text{if } (y_i \rangle\rangle 2^{nq})\langle\rangle(y_i \rangle\rangle 2^{nq}) \\ \text{if } (z_i \rangle\rangle 2^{nq})\langle\rangle(z_i \rangle\rangle 2^{nq}) \end{cases} \quad \text{(Equation 6)}$$

The symbol "<>" stands for "not equal to." The incoming measured value is discarded if it does not adhere to the predetermined distance from one of the stored measured values. For the measured value, a cluster is determined by determining the index (j, k, l) of the clusters for each measuring axis in which the measured value of the component lies. If the number of measured values assigned to this cluster is smaller than a predetermined number, the incoming measured value is assigned to the cluster.

Possible Implementation 2 (General):

The instantaneous measured value of all axes is divided by a constant for classifying the data in clusters. As a function of the accuracy of the arithmetic logic unit, this constant represents (i) a power of two, (ii) an integer or (iii) a floating-point number.

$$Cluster_i = \begin{pmatrix} \dfrac{\text{Measured value}_x}{L_x} \\ \dfrac{\text{Measured value}_y}{L_y} \\ \dfrac{\text{Measured value}_z}{L_z} \end{pmatrix} \quad \text{(Equation 7)}$$

where i is the variable of the cluster and Lx, Ly, Lz are the cluster sizes in the x, y and z direction. The cluster size may, for example, be determined using the following equation (ascertains an optimal size of the cluster as a function of the other parameters):

$$L = \left(\dfrac{2\pi \cdot \text{Radius}^2 \cdot N_c}{N_{pts}}\right) \quad \text{(Equation 8)}$$

where:
Radius=radius of the sphere from FIG. 2
$N_c$=number of measured values per cluster
$N_{pts}$=number of measured values for calibration.

To make it possible to store the required minimum number of points, the following conditions of the calculation of the cluster size are necessary:

$$L = \begin{cases} [\text{if } L\rangle\text{Radius} \Rightarrow L = 0.5 \cdot \text{Radius}] \\ \text{otherwise} \Rightarrow L = \left(\dfrac{2\pi \cdot \text{Radius}^2 \cdot N_c}{N_{pts}}\right) \end{cases} \quad \text{(Equation 9)}$$

An incoming measured value is first checked to determine if it adheres to a minimum distance of half a cluster from the most recently stored measured value:

$$\begin{cases} \text{if } (x_i - x_{last}) \geq (0.5 \cdot L_x) \\ \text{if } (y_i - y_{last}) \geq (0.5 \cdot L_y) \\ \text{if } (z_i - z_{last}) \geq (0.5 \cdot L_z) \end{cases} \quad \text{(Equation 10)}$$

If this is the case, the incoming measured value is compared to each stored measured value:

$$\begin{cases} \text{if } (x_i \mid L_x)\langle\rangle(x_k \mid L_x) \\ \text{if } (y_i \mid L_y)\langle\rangle(y_i \mid L_y) \\ \text{if } (z_i \mid L_z)\langle\rangle(z_i \mid L_z) \end{cases} \quad \text{(Equation 11)}$$

The incoming measured value is discarded if it does not adhere to the predetermined distance from one of the stored measured values. For the measured value, a cluster is determined by determining the index (j, n, l) of the clusters for each measuring axis in which the measured value of the component lies. If the number of measured values assigned to this cluster is smaller than a predetermined number, the incoming measured value is assigned to the cluster.

The offset is determined if a predetermined number of measured values has been recorded or if the predetermined number of clusters has a predetermined number of assigned measured values in each case. After that, additional measured values may be recorded and stored, making improved determinations of the offset possible ("in-use calibration").

Figure 4:
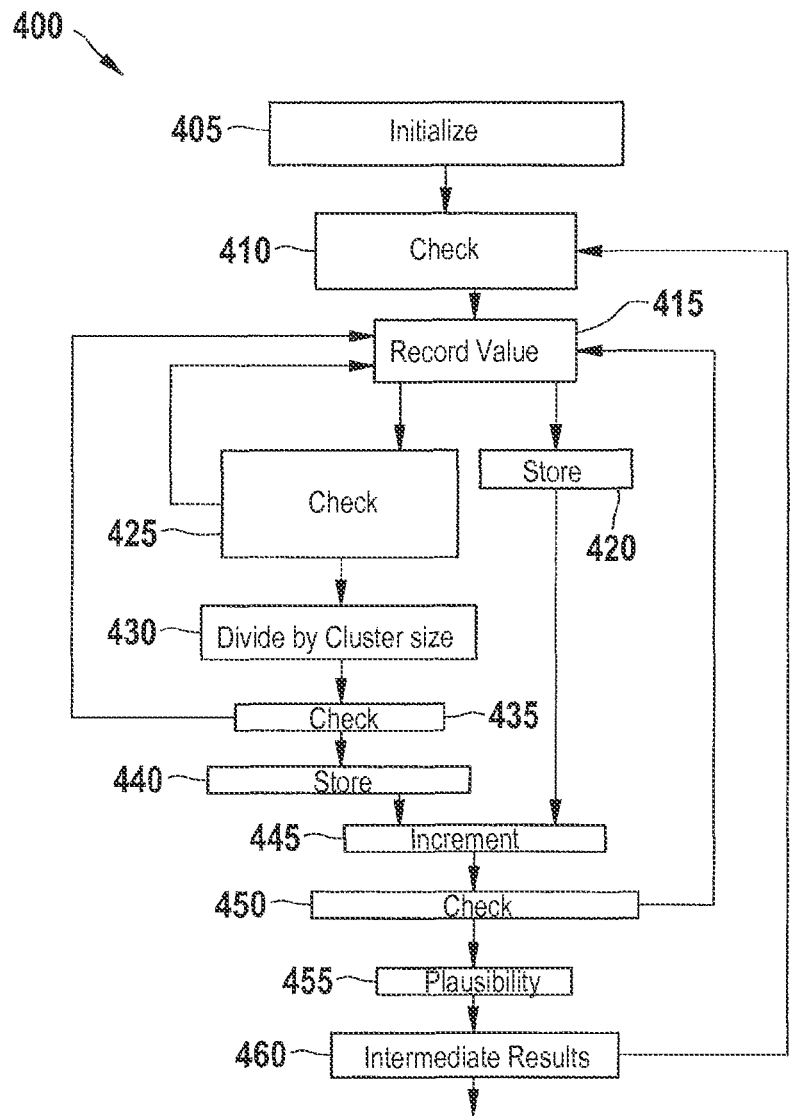
FIG. 4 shows a block diagram of an expanded method according to FIG. 3.

FIG. 4 shows a flow chart of a method 400 as an exemplary embodiment of method 300 from FIG. 3. In a first step 405, parameters of method 400 are initialized. This includes the number of measured values to be assigned to a cluster, a determination of the sensitivity of multiaxial sensor 110, a determination of the field strength and a preparation of memory 130.

In a subsequent step 410, a check is performed to determine whether intermediate results of a preceding pass of method 400 are present. If this is the case, filter parameters are determined based on these intermediate results. If no intermediate results are present, the filter parameters are determined based on presets.

A multidimensional measured value is recorded in step 415. If it is the first measured value, it is immediately stored in a step 420.

Otherwise, a check is performed in a step 425 to determine whether the incoming measured value adheres to a distance of at least half a cluster size from a previously stored measured value. If this is not the case, the measured value is discarded and method 400 continues with step 415. Otherwise, the stored measured values and the incoming measured value are divided by the cluster size in a step 430. In a step 435, a check is performed to determine whether a predetermined number of measured values has already been assigned to the cluster. If this is the case, the method continues with step 415. Otherwise, the incoming measured value is stored in a step 440.

In a step 445, the number of stored measured values is incremented. In a step 450, a check is performed to determine whether the number of measured values has reached a predetermined threshold value. If this is not the case, method 400 continues with step 415 in order to record another incoming measured value. Otherwise, all stored measured values are checked for plausibility in a step 455, it being possible for implausible measured values to be discarded. Intermediate results for the filtering are then determined in a step 460 and the method continues with step 410.

One of the intermediate results determined in step 460 relates to the offset of the measured values. In order to determine this, a conventional method, for example, the iterative Newton-Gauss method or the method of least squares, is used for determining a sphere which is optimally approximate to the stored measured values. An offset of the center point of the sphere from the origin of the measuring axes is then the sought offset of the measured values. The determined offset is also optionally output in step 460.

What is claimed is:

1. A method for determining an offset of measured values of a multiaxial directional sensor using a superposed signal, comprising:
    recording, by a processor, a large number of multiaxial measured values;
    determining, by the processor, a geometric figure as an approximation of the large number of multiaxial measured values;
    determining, b the processor, the offset of the measured values based on an offset of the figure in relation to an interference-free position of the figure;
    assigning, by the processor, a recorded measured value to one of a plurality of predetermined clusters; and
    discarding, by the processor, the measured value if a predetermined number of measured values has already been assigned to the cluster to which the measured value is assigned.

2. The method as recited in claim 1, wherein the determination of the offset is not made until the predetermined number of measured values has been assigned to each of a predetermined number of clusters.

3. The method as recited in claim 1, wherein the clusters are uniformly distributed along measuring axes.

4. The method as recited in claim 1, wherein the number of clusters is a power of two and the assignment includes a division of the multiaxial measured value by a power of two.

5. The method as recited in claim 1, further comprising:
    storing the measured value assigned to a cluster in a memory.

6. The method as recited in claim 5, wherein additional measured values are recorded after the determination of the offset and assigned to the clusters and the offset is updated.

7. The method as recited in claim 6, further comprising:
    after the determination of the offset, determining, by the processor, an expansion of the figure; and
    adjusting, by the processor, at least one of a number of clusters on one of the measuring axes, a number of predetermined measured values per cluster, and a predetermined number of clusters having assigned measured values as a function of the expansion.

8. The method as recited in claim 1, wherein the directional sensor is a magnetic field sensor, the number of measuring axes is three and the figure is a sphere.

9. The method as recited in claim 1, wherein the figure is determined using least squares method.

10. A non-transitory computer readable medium containing computer instructions stored therein for causing a processing unit to perform the steps of:
    recording a large number of multiaxial measured values;
    determining a geometric figure as an approximation of the large number of multiaxial measured values;
    determining the offset of the measured values based on an offset of the figure in relation to an interference-free position of the figure;
    assigning a recorded measured value to one of a plurality of predetermined clusters; and
    discarding the measured value if a predetermined number of measured values has already been assigned to the cluster to which the measured value is assigned.

* * * * *